United States Patent
Boshev

(10) Patent No.: US 11,522,975 B2
(45) Date of Patent: Dec. 6, 2022

(54) DOUBLE PERSISTENCE LAYER USING AN IN-MEMORY MAP

(71) Applicant: SAP SE, Walldorf (DE)

(72) Inventor: Stoyan Zhivkov Boshev, Sofia (BG)

(73) Assignee: SAP SE, Walldorf (DE)

( * ) Notice: Subject to any disclaimer, the term of this patent is extended or adjusted under 35 U.S.C. 154(b) by 137 days.

(21) Appl. No.: 17/067,223

(22) Filed: Oct. 9, 2020

(65) Prior Publication Data
US 2022/0116475 A1    Apr. 14, 2022

(51) Int. Cl.
| | | |
|---|---|---|
| *G06F 15/16* | (2006.01) | |
| *H04L 67/5682* | (2022.01) | |
| *G06F 9/50* | (2006.01) | |
| *G06F 16/27* | (2019.01) | |
| *G06F 9/54* | (2006.01) | |
| *H04L 67/60* | (2022.01) | |

(52) U.S. Cl.
CPC ........ *H04L 67/5682* (2022.05); *G06F 9/5016* (2013.01); *G06F 9/545* (2013.01); *G06F 16/273* (2019.01); *H04L 67/60* (2022.05)

(58) Field of Classification Search
None
See application file for complete search history.

(56) References Cited

U.S. PATENT DOCUMENTS

| 11,265,236 B1 | 3/2022 | Yousouf et al. | |
| 2013/0066955 A1* | 3/2013 | Neel | H04L 67/42 709/203 |
| 2016/0179637 A1* | 6/2016 | Winokur | G06F 13/4221 714/5.1 |
| 2016/0306719 A1* | 10/2016 | Laicher | G06F 11/2028 |
| 2019/0197174 A1* | 6/2019 | Kim | G06F 16/258 |
| 2020/0110700 A1* | 4/2020 | Shi | G06F 12/0897 |
| 2020/0233877 A1* | 7/2020 | Patel | G06F 16/2282 |

OTHER PUBLICATIONS

U.S. Appl. No. 17/068,245, filed Oct. 12, 2020, Boshev.
U.S. Appl. No. 17/098,618, filed Nov. 11, 2020, Boshev et al.
U.S. Appl. No. 17/169,754, filed Feb. 8, 2021, Yousouf et al.
U.S. Appl. No. 17/170,105, filed Feb. 8, 2021, Yousouf et al.
U.S. Appl. No. 17/170,166, filed Feb. 8, 2021, Yousouf et al.

* cited by examiner

*Primary Examiner* — Alex Gofman
(74) *Attorney, Agent, or Firm* — Fish & Richardson P.C.

(57) ABSTRACT

The present disclosure relates to computer-implemented methods, software, and systems for database persistency. A first data request is received at a first instance of an application. The application is associated with multiple instances that share the database layer. In response to determining that the database is available for accessing after receiving the first request, the database is identified as a primary storage for the application, the data is written in the database and at an in-memory persistence storage of the first instance of the application. In response to determining that the database has become unavailable after identifying the database layer as the primary storage, the in-memory persistence storage is configured as the primary storage for the first instance of the application. A second request received at the first instance of the application is routed to the in-memory persistence storage while the in-memory persistence storage is configured as the primary storage.

17 Claims, 6 Drawing Sheets

DOUBLE PERSISTENCE LAYER USING AN IN-MEMORY MAP

TECHNICAL FIELD

The present disclosure relates to computer-implemented methods, software, and systems for data processing in a platform environment.

BACKGROUND

Software applications and application services may include front-end and back-end applications and application logic that execute to provide functionality and serve requests from end-users. When an application or application service is running, they consume resources from a database in relation to execution of operations, such as a read operation, a write operation, and an edit operation, among others. When these applications and services execute, they may read and write data from a database layer where one or more databases reside. A failure in the database layer may cause disruption to the provided services by the software applications and reduction in their availability.

SUMMARY

The present disclosure involves systems, software, and computer implemented methods for providing data persistency for software applications consuming database resources in a high availability mode.

One example method may include operations such as receiving a first request at a first instance of an application, the first request associated with a request to write data in a database layer associated with the application, wherein the application is associated with a plurality of instances, and wherein the plurality of instances share the database layer for reading and writing data associated with the application; in response to determining that the database layer is available for accessing after receiving the first request: identifying the database layer as a primary storage for the application; writing the data in the database layer; and writing the data at an in-memory persistence storage associated with the first instance of the application; and in response to determining that the database layer has become unavailable for accessing after identifying the database layer as the primary storage for the application: configuring the in-memory persistence storage as the primary storage for the first instance of the application; writing the data at the in-memory persistence storage at the first instance of the application; and routing a second request received at the first instance of the application to the in-memory persistence storage while the in-memory persistence storage is configured as the primary storage for the first instance of the application, wherein the second request is for reading or writing data at the database layer. Other implementations of this aspect include corresponding systems, apparatus, and computer programs, configured to perform the actions of the methods, encoded on computer storage devices.

Implementations can optionally include iteratively checking whether the database layer is available for accessing to maintain a current availability status of the database layer for the application. Further, in some instances, a primary persistence storage can be dynamically configured for the first instance of the application, wherein dynamically configuring the primary persistence storage comprises: configuring the database layer as the primary persistence storage when a current availability status of the database layer is determined to available; and in response to determining that the current availability status of the database layer is unavailable, dynamically changing the primary persistence storage to the in-memory persistence storage.

In some instances, in response to determining that the database layer is available after configuring the in-memory persistence storage as the primary storage for the first instance of the application: a synchronization of data between the in-memory persistence storage and the database layer is performed; and the database layer is configured as the primary storage for the application.

In some instances, the synchronization may include copying data stored at the in-memory persistence storage to the database layer, wherein the copied data is data that is not persisted at the database layer; and deleting data stored at the database layer that does not correspond to data persistent in the in-memory persistence storage. In some instances, while the synchronization is performed and until the synchronization is complete, the in-memory persistence storage continues to be configured as the primary storage.

In some instances, storing the data at the in-memory persistence storage includes converting the data to key-value pair data to store the key-value pair data to the in-memory persistence storage. The in-memory persistence storage is a map storage associated with the first instance of the application. The key-value pair data can be stored to the in-memory persistence storage associated with the first instance of the application.

In some instances, the data stored at the in-memory map storage associated with the first instance of the application is automatically replicated to at least one other instance of the application from the plurality of instances of the application.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

The present disclosure describes various tools and techniques for providing data persistency for software applications consuming database resources in a high availability mode.

In some instances, a software application provides services to end-users and consumes resources from associated databases, for example, by reading, writing, updating, and/or synchronizing data. The software application may be associated with multiple instances running in parallel to scale an expected and available service level provided by the application. The instances of the application may include application logic and persistency logic that communicate with a database layer for the application. In some instances, the database layer may include one or more databases that can be accessed when, or in response to, executing the logic implemented at the application layer. The application logic includes logic implementing functionality provided by the software application. The persistency logic may include logic implementing communication between the application logic and a database layer to perform different operations in relation to storing data at a database part of the database layer. The persistency logic may access the database for reading and writing data according to received requests from the application logic (e.g., in response to end-users communicating with the application instance). If the database becomes unavailable, for example, due to a network or other issue that causes downtime for the database, requests received at the application instance may not be processed. Thus, an in-memory persistence layer can be configured at or in relation to the application instances such that data stored at the database is concurrently stored in-memory for the application instances. In doing so, the present solution provides a backup storage for when the database is unavailable and supports high availability for the application. In such cases, when requests for data are received at an instance of the application, even if the database is experiencing a downtime, the application can serve the data request by using the in-memory database storage as a backup.

Figure 1:
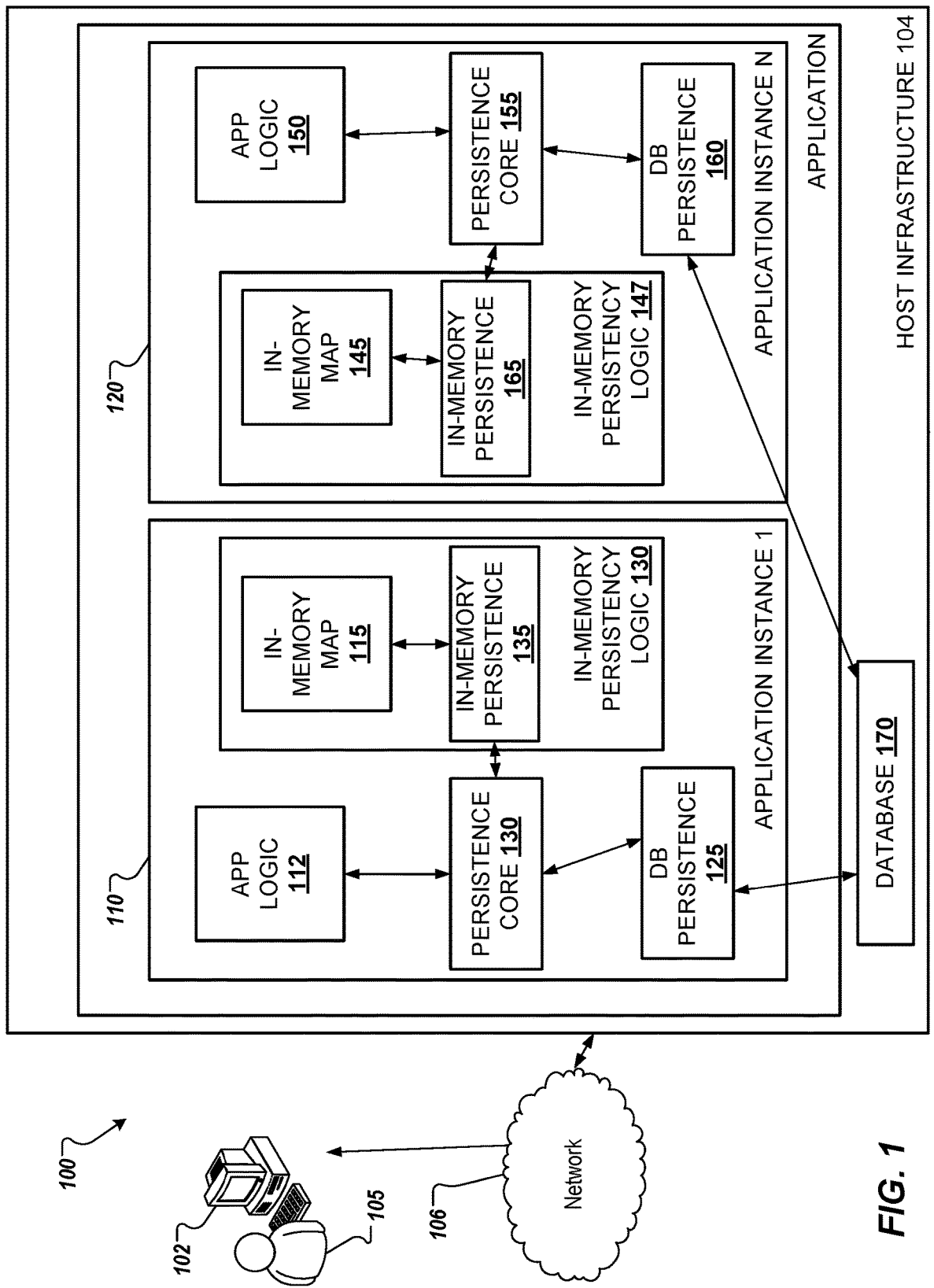
FIG. 1 illustrates an example computer system architecture that can be used to execute implementations of the present disclosure.

FIG. 1 depicts an example architecture 100 in accordance with implementations of the present disclosure. In the depicted example, the example architecture 100 includes a client device 102, a network 106, and a host infrastructure 104. The host infrastructure 104 includes one or more server devices and databases (e.g., processors, memory). In the depicted example, a user 105 interacts with the client device 102.

In some examples, the client device 102 can communicate with the host infrastructure 104 over the network 106. The client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a computer network, such as a local area network (LAN), a wide area network (WAN), the Internet, a cellular network, a telephone network (e.g., PSTN), or any appropriate combination thereof connecting any number of communication devices, mobile computing devices, fixed computing devices and server systems.

In some implementations, the host infrastructure 104 includes at least one server and at least one data store. In the example of FIG. 1, the host infrastructure 104 is intended to represent various forms of servers including, but not limited to, a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the host infrastructure 104 can host an application that is running with multiple instances, including "Application Instance 1" 110 to "Application Instance N" 120. The application instances 110, 120 receive end-user requests and execute application logic (e.g., at application logic 112 or application logic 150), implemented correspondingly at the particular application instances. The different instances of the application use, as a database layer, a common database (i.e., database 170). When the application instances execute implemented logic, they can perform different operations on the common database, including reading data from and writing data into the database 170.

In some instances, "Application Instance N" 120 includes application logic 150, a persistence core 155, in-memory storage logic 147 including in-memory persistence 165 and an in-memory map storage 145, and database persistence logic 160.

The persistence core 130 of "Application Instance 1" 110 is a component implementing persistency logic for the application that manages access to data of the application 101. The responsibilities of the persistence core 130 include performing read operations from a configured primary persistence storage when the application logic 112 requests to read data. The persistence core 130 also receives requests for storing data and is configured to store the data in both a primary and a backup persistence storage when application logic 112 requests to write data. In particular, when a write operation is requested, the data is stored at a configured primary data storage (e.g., the database layer) and at a backup storage (e.g., the in-memory map 115 that receives requests from the persistence core 130 through the in-memory persistence 135). In such cases, data is maintained at two storages; when a database layer is unavailable, services can be provided through the in-memory storage and the data stored therein. To support such persistency, the "Application instance 1" 110 may be configured to define one of these two storages as a primary storage and operate with that defined primary storage as a first source of data. When a previously unavailable database becomes available again, the in-memory storage (i.e., in-memory map 115) has been configured as a primary storage for the period when the database is unavailable. When the database becomes available, the primary storage is reconfigured to point to the database instead to the in-memory map 115. In response to the database becoming available, the in-memory map 115 can be synchronized with the database 170, and the database 170 can be configured to operate as the primary storage when updated with data from the in-memory storage.

In some instances, and using application instance 1 110 as an example, the persistence core 130 is configured to detect whether a database persistence 125 has become unavailable.

In response to such a detection, the persistence core 130 can failover the application instance 110 to the backup in-memory persistence logic 135 and proceed with storing data at the in-memory map 115. The persistence core 130 detects when the database persistence 125 becomes available again (i.e., when the database 170 is available), and the persistence core 130 performs a data synchronization operation between data from the in-memory map 115 to database 170. When data between the database 170 and the in-memory map 115 is synchronized, the persistence core 130 can then configure the database 170 as a primary storage for performing read and write operations.

The database persistence 125 component is configured to manage communication between the application logic 112 and the database 170. The database persistence 125 reads and writes data to the database 170. The database persistence 125 detects when the database 170 is unavailable. When the database 170 is unavailable, the database persistence 125 can return suitable responses to the persistence core 130, allowing the persistence core 130 to be aware of the unavailability and to reconfigure the primary storage for the application instance 110 from the database 170 to the in-memory map 115. In some cases, the database persistence 125 component may periodically check the availability status of the database 170 and, when the database 170 becomes unavailable or available (e.g., based on an indication for a change in the status), can notify the persistence core 130 of the change.

In some instances, the persistence core 130 communicates with the in-memory persistence 135 to perform backup operations to support persistency of data and high availability of the application when the underlying database 170 is not running and/or is having a downtime. The in-memory persistence 135 component reads and writes data in the in-memory map 115. When the in-memory persistence 135 sends a request to store data, the in-memory persistence 135 can convert the data to a suitable key-value format pair and can store the data in key-value format in the in-memory map 115.

The in-memory map 115 resides in the memory of the "Application Instance 1" 110. The in-memory map 115 is a storage having a map structure that stores data as key-value pairs. As the in-memory storage uses a map structure, the synchronization of data between multiple instances and their respective in-memory storages (e.g., in-memory map 115 synchronizes with in-memory map storage 145) is improved. In some instances, the map structure supports automatic replication between the multiple instances of the application. The in-memory map 115 may be defined as in-memory data grid platform. Such platforms can be, for example, HAZELCAST, INFINISPAN, and others.

Figure 2:
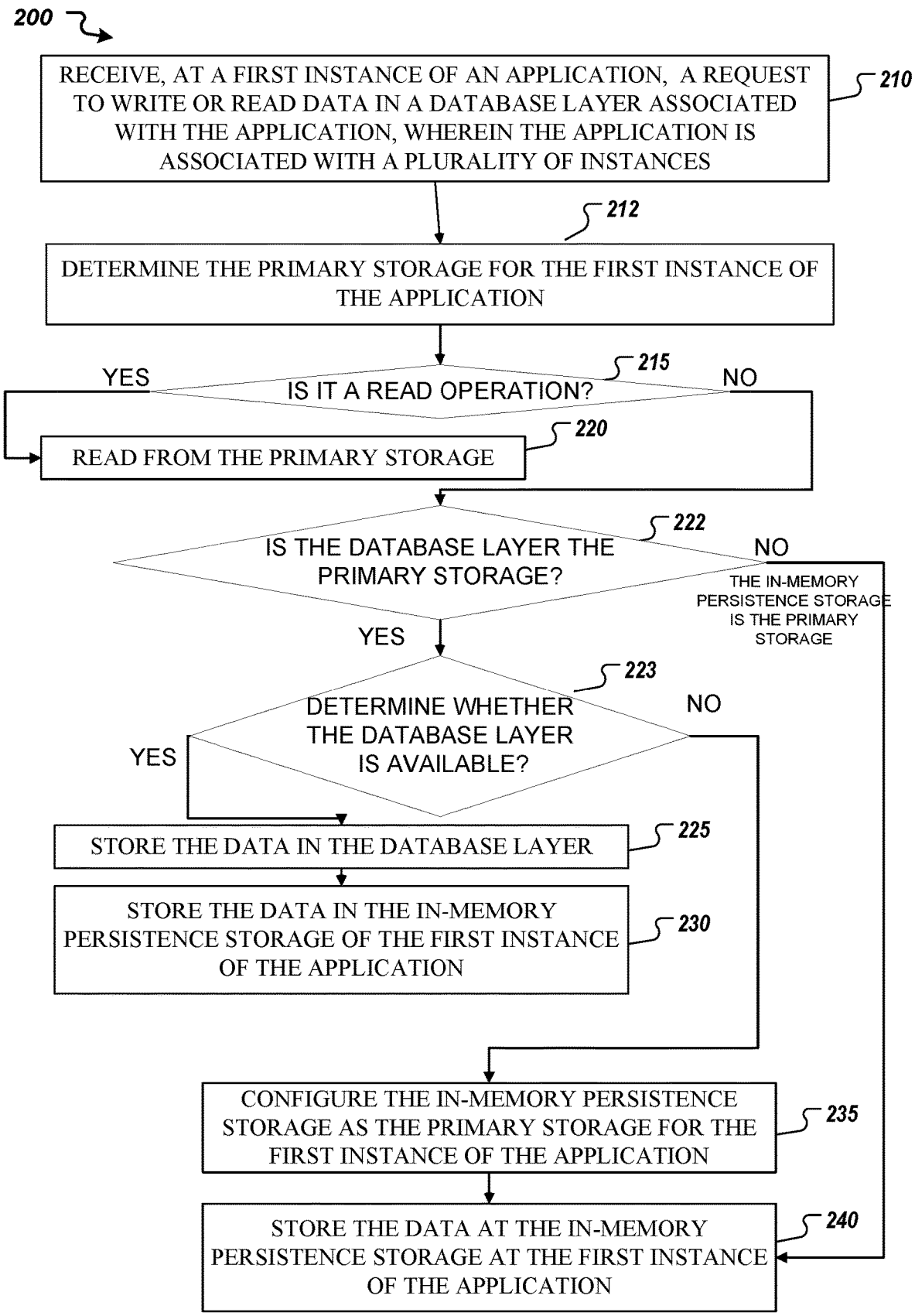
FIG. 2 is a flowchart for an example method for providing data persistency for an application in accordance with implementations of the present disclosure.

FIG. 2 is a flowchart for an example method 200 for providing data persistency for an application instance in accordance with implementations of the present disclosure. The application may be such as the application discussed in relation to FIG. 1. The application may be associated with multiple instances running at a host environments, such as the "Application instance 1" 110 and "Application instances N" 120 as described in FIG. 1. When the application is running, it may serve different requests from users that can be handled by different instances of the application. During application's execution, the application logic is executed and a database layer of the application may be called for data associated with the application. For example, an end-user may request to store a data record. In response, the application logic may invoke a write operation to store the data at a database of the database layer. In other examples, an end-user may submit a request for a data record that was previously stored in the database, for example, through a previous store operation performed from the same or another application instance. In such cases, the different instances of the application may share a common database layer that provides common storage for data. If the database is down and/or cannot be accessed by the current instance of the application, requests received from the application logic running at the different instances cannot be executed, and the application instance becomes unavailable.

At 210, a request is received at a first instance of an application. The first request is associated with a request to write or read data in/from the database layer associated with the application. In some instances, the application is associated with a plurality of instances including the first instance. The plurality of instances can be sharing the database layer for reading and writing data associated with the application.

At 212, it is determined which is the primary storage that is configured for the first application instance. The application instance may be configured with the database layer as a primary storage, and whenever the database layer is unavailable, the application instance may transition the data-operations to an in-memory persistence storage that maintains a copy of the data at the database while the database is configured as the primary storage.

At 215, it is determined whether it is a read operation or whether it is a write operation. If the operation is a read operation, at 220, data as requested is read from the primary storage as determined at 212.

If the operation is not a read operation, but it is a write operation, at 222, it is determined whether the database layer is the primary storage. If the database layer is determined to be the primary storage, then at 223, it is determined whether the database layer is available to be accessed. If the database layer is not determined to be the primary storage (at 222), then at 240, the data is written to the in-memory persistence storage at the first instance of the application. If it is determined that the database layer is the primary storage but the database is unavailable, then at 235, the in-memory persistence storage is configured to be the primary storage for the first instance of the application. As the in-memory persistence storage is configured as the primary storage at 235, then at 240, the data is stored at the in-memory persistence storage.

The configuration can be performed (at 235) at the first instance of the application, such that for any further requests for data-related operations, the storage that is configured as the primary storage (here, the in-memory persistence storage layer) can be used as the first data source for performing data operations such as data queries, viewing data, writing new data, and updating existing records, among others.

If it is determined that the database layer is the primary storage and the database layer is available and can be accessed, then at 225, the data from the requested write operation is stored at the database layer, and at 230, the data is stored in the in-memory persistence storage as a backup copy.

The in-memory persistence storage may be, for example, the in-memory map 115 of FIG. 1. In some instances, the in-memory persistence storage may reside in the persistence layer of the first application instance, and may be configured to store in-memory data based on requests received at the persistence layer through the application logic of the first application instance. By storing requested data within the memory of the first application instance, a backup storage for the data is created, thus, if the database becomes unavailable at any point, the in-memory persistence storage can take over the role of a primary data storage (i.e., instead of the database) to provide high availability for the application as a whole. In some instances, by configuring the in-memory persistence storage as the primary storage, when a request is received at the application instance (e.g., to write data), such a request would be executed by writing (e.g., storing) the data at the in-memory persistence storage. If the application instance has configured the in-memory persistence storage as the primary storage, a read operation for data of the application instances would be routed to the in-memory persistence storage. Since the in-memory persistence storage is within the memory of the application instances, execution of requests for performing data-operations can be performed faster.

In some instances, a configuration of the primary storage as the database layer or the in-memory persistence storage can be dynamically changed, such as and in response to determining the availability of the database layer. The configuration is adjusted so that requests received at an application instance, such as the first application instance, are processed even if the database layer is unavailable, for example, while experiencing downtime due to a network failure.

In some instances, storing the data at the in-memory persistence storage can be performed by storing key-value pair data. For example, the first request received at 210 may be for storing received data, and the received data may be such data that allows for storing in a key-value format. For example, the data may include one or more data values for one or more data attributes associated with the request. An in-memory map storage can be configured for the first application instance to store the key-value pair data. For example, a data request to be stored (e.g., written) can be converted to key-value pair data to store the key-value pair data to the in-memory map storage at the first instance of the application.

In some instances, the availability status of the database layer can be iteratively checked to determine whether the database layer is accessing. In doing so, a current availability status of the database layer for the application is maintained, and the configuration of the primary database storage can be dynamically updated upon identifying a change of the database's availability status.

In some instances, a primary persistence storage for the first application instance can be dynamically configured. The primary persistence storage can be defined as a storage that is associated with performing a currently received data request, for example, related to data writing, data reading, data updating, etc. In some instances, the dynamic configuration of the primary persistence storage includes configuring the database layer as the primary persistence storage when a current availability status of the database layer is determined to be available, and, when the current availability status of the database layer is unavailable, dynamically changing the primary persistence storage to the in-memory persistence component.

In some instances, in response to determining that the database layer is available after the in-memory persistence component has previously been configured as the primary storage for the application instance, a data synchronization operation between the in-memory persistence component and the database layer can be performed. When the database layer is determined to be available (e.g., after a certain downtime period), the configuration for the primary storage for the first application instance can be updated and set to the database layer. In doing so, future requests will be directed back to the database layer.

In some instances, when data synchronization is performed between the in-memory persistence component of the first instance and the database layer (e.g., when the database layer becomes available after a period of unavailability such as downtime), data stored at the in-memory persistence component is synchronized with the data at the database layer. The data synchronization operation can include copying data stored at the in-memory persistence component to the database layer, where the copied data is data that is not persisted at the database layer during the database layer's respective unavailability. The data synchronization operation can also include deleting data stored at the database layer that does not correspond to data persistent in the in-memory persistence storage. Thus, at the end of a data synchronization operation, the data stored at the database layer corresponds to the data at the in-memory persistence, and the first application instance can switch to the database layer as a primary storage, as the database has been updated to include any data that would have been stored there if the unavailability had not occurred. In some instances, the in-memory persistence serves as a backup storage located in-memory for the first application instance, and can provide data persistence when a database layer is inaccessible such that the first application instance can operate and provide services even if the database layer is unavailable.

In some instances, while synchronization is performed and prior to its completion between the database layer and the in-memory persistence component, the in-memory persistence component is maintained as the primary storage. In some of these instances, the in-memory persistence component is used for serving requests related to reading and writing data until synchronization is completed, and the data stored at the in-memory persistence component is transferred to the database layer, and, in some cases, where the database layer is updated to remove or delete data that has been removed from or updated within the in-memory persistence data since the last synchronization.

In some implementations, and because the application can run as multiple instances that rely on a common database layer, when data is stored at the in-memory map storage at the first application instance of the application, that key-value pair data can be automatically replicated to at least one other application instance.

Figure 3:
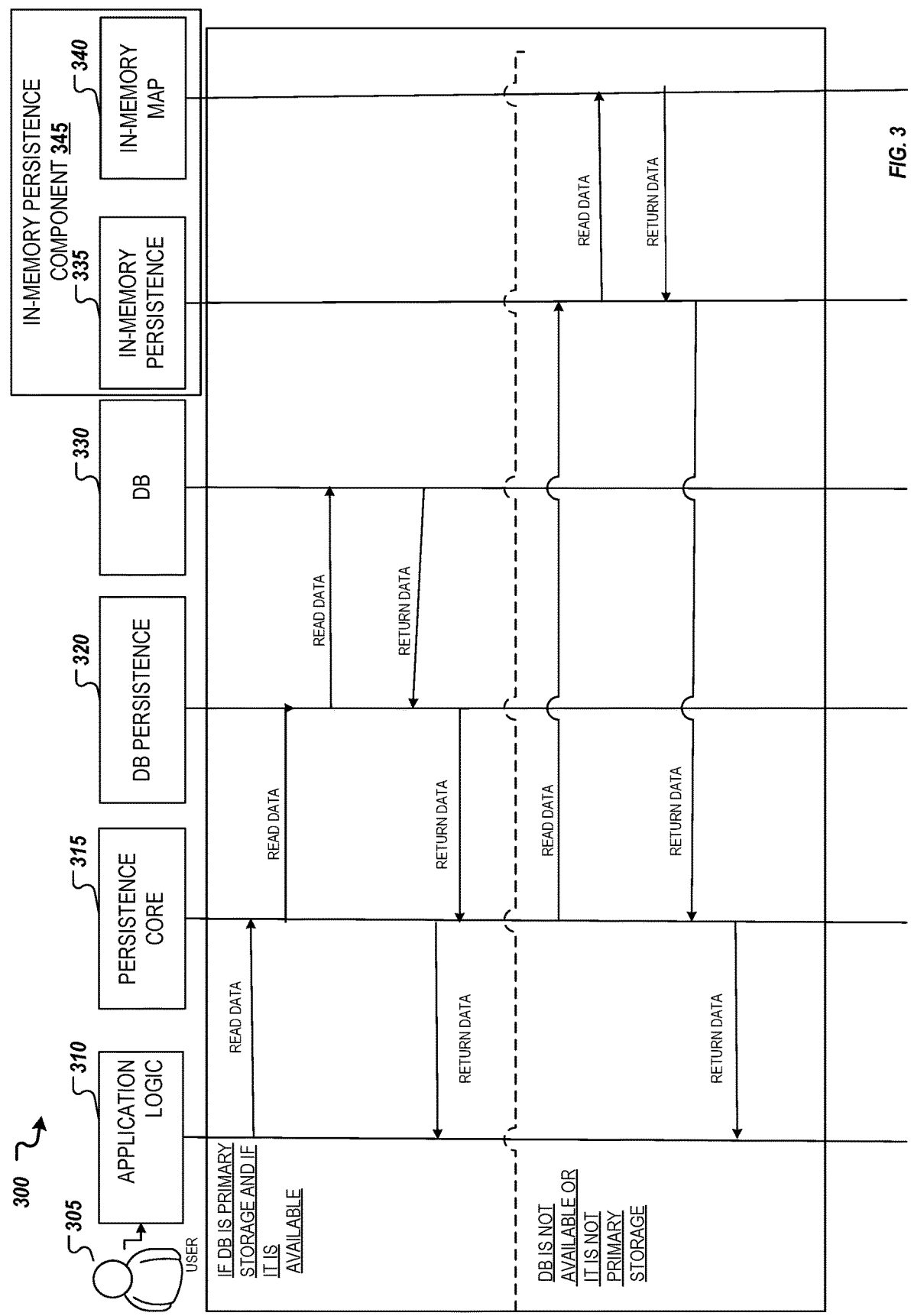
FIG. 3 is a block diagram for an example method for providing persistency during a read operation in accordance with implementations of the present disclosure.

FIG. 3 is a block diagram for an example method 300 for providing persistency during a read operation in accordance with implementations of the present disclosure. The method 300 may be performed in relation to an application running with multiple instances, such as "Application instance 1" 110 to "Application instance N" 120 of FIG. 1.

In some instances, an application including application logic 310 receives a request to read data from an end-user 305. The request may be received at a first instance of the application, such as for example, "Application Instance 1" 110 of FIG. 1. For example, the request to read data may be related to reading a data record associated with a performed operation, a data record associated with an item stored in a database table, or any other suitable request.

In response to receiving a request for performing a read operation, the application logic 310 can send a read request operation to a persistence core module 315, which can be part of the application and a corresponding application instance that processes the requests. The application logic 310 may be, for example, the application logic 112 of FIG.

1, and the persistence core 315 may be, for example, the persistence core 130 of FIG. 1. The persistence core 315 can perform a read operation from the database layer 330 if the database layer 330 is available and configured as the primary storage for the application. Additionally, the persistence core 315 can determine that the database is not available and is not configured as a primary storage for the application. In such instances, the persistence core 315 may perform a read operation from an in-memory persistence component 345 in response to the received initial read request operation. The in-memory persistence component 345 may be invoked to perform the read operation in response to the persistence core 315 sending the read operation to the in-memory persistence 335 module. The in-memory persistence 335 module may evaluate the received read operation and send a read operation to an in-memory map storage 340, where the in-memory map storage 340 is an in-memory storage including data for the application in the form of key-value pairs that correspond to the stored data at the database layer 330 of the application. The in-memory map 340 may receive the read request for data and provide a return output including the requested data, if such data is available at the in-memory map 340. The in-memory persistence module 335 can then return the data received from the in-memory map 340 to the persistence core module 315 and return that data to the application logic 310, which can provide the data to the end-user 305.

Figure 4:
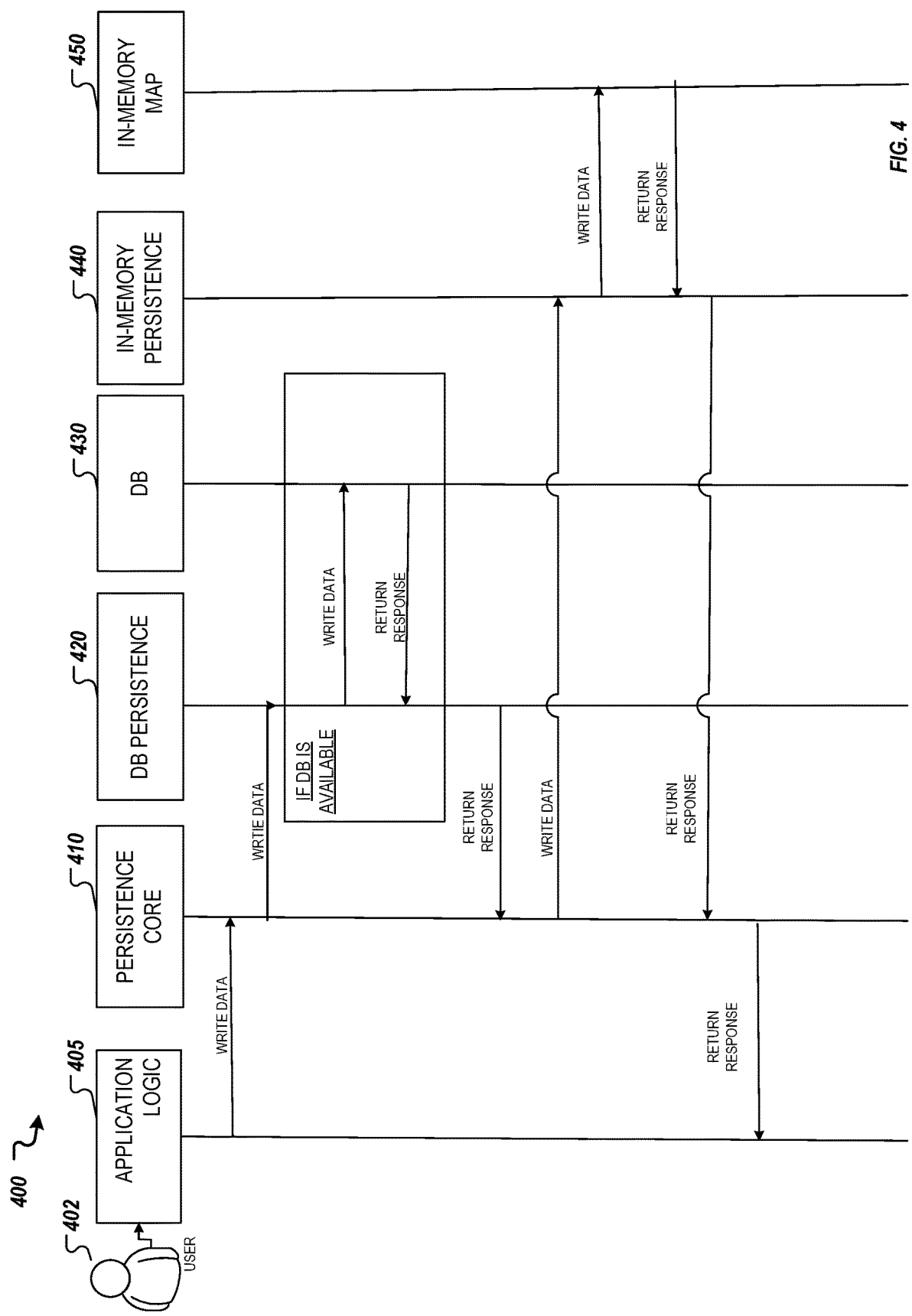
FIG. 4 is a block diagram for an example method for providing persistency during a write operation in accordance with implementations of the present disclosure.

FIG. 4 is a block diagram for an example method 400 for providing persistency during a write operation in accordance with implementations of the present disclosure. The example method 400 is associated with an application, such as the application describes in relation to FIG. 3 and the read operation processes at method 300.

The method 400 is associated with application logic 405, persistence core 410, database persistence 420, database 430, in-memory persistence 440, and an in-memory map 450 that, in some instances, can correspond to the application logic 310, persistence core 315, database persistence 320, database layer 330, in-memory persistence 335, and in-memory map 340 of FIG. 3, as well as to components discussed in relation to FIG. 1 and FIG. 2.

In some instances, an end-user 402 sends a request to application logic 405 corresponding to a first application instance. The application logic 405 may be similar to the application logic 112 of FIG. 1. In response to the received request, the application logic 405 sends a write data operation to a persistence core module 410 of the application instance. The persistence core 410 may evaluate the received write request and send the request for writing the data to a database persistence module 420 that can store requested data in the database 430. The performance of the write operation at the database 430 may depend on whether the database 430 is available and accessible for performing a storing operation or not. If the database 430 is available, then the database persistence module 420 may perform the write operation and provide a return response to the persistence core 410 indicating the result of the performed operation.

Based on the received request to perform a write operation at the persistence core 410, an in-memory persistence component is called, where in-memory persistence logic 440 is invoked to receive the write request and to evaluate the data received for storing at an in-memory map storage 450. If needed, the in-memory persistence 440 can convert a received request to write data into key-value pair data and store the key-value pair data into the in-memory map 450. Once the data is written in the in-memory map 450, a response for the executed write operation may be provided from the in-memory map 450 to the in-memory persistence 440 that can be returned to the application logic 405 through the persistence core 410.

Figure 5:
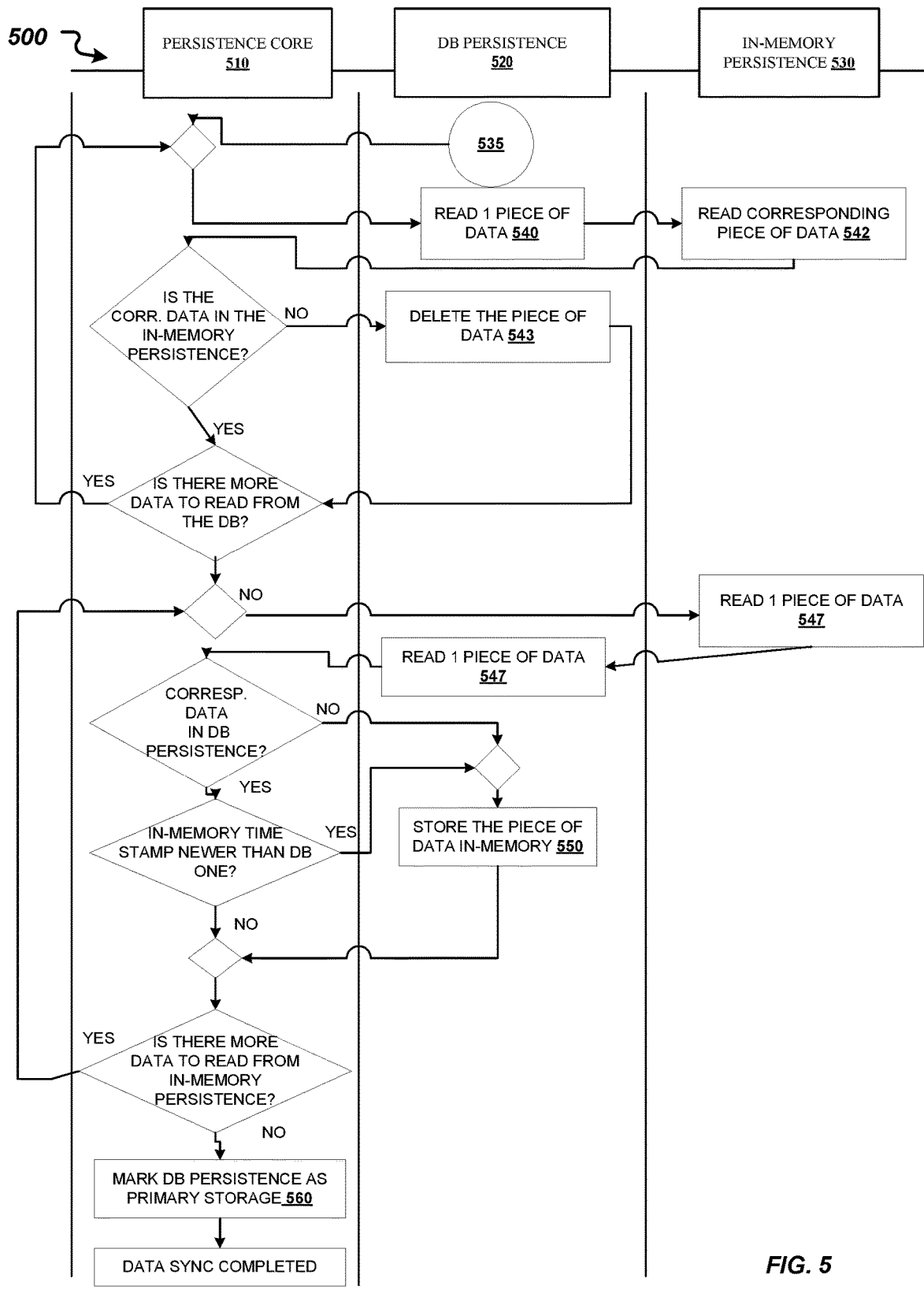
FIG. 5 is a block diagram for an example method for data synchronization in accordance with implementations of the present disclosure.

FIG. 5 is a block diagram for an example method 500 for data synchronization in accordance with implementations of the present disclosure. In some instances, the example method 500 is associated with a data synchronization performed for an application running with multiple instances that share a common database layer, where each instance includes in-memory persistence storages to keep in-memory data to be replicated to the database layer and that can take over the database primary storage role when the database is not available.

In accordance with the implementations of the present disclosure, and in the context of an application running with multiple instances, such as "Application Instance 1" 110 and "Application Instance N" 120 of FIG. 1, when the database layer becomes unavailable, the in-memory persistence can be configured to take over as a primary storage. This may be performed as discussed above; for example, as described in FIGS. 1 and 2, among others.

In the context of the illustrated example method 500, a persistence core module 510, a database persistence module 520, and an in-memory persistence module 530 are shown, and can, in some instances, correspond to the persistence core module 130 of FIG. 1, the database persistence 125 of FIG. 1, and the in-memory persistence 135 of FIG. 1. The persistence core 510 may receive a notification (at 535) from the database persistence 520 that the database layer has become available. Since the database layer was not available, the in-memory persistence component has been configured as a primary storage for the application, and the in-memory map includes data stored for the application instance during the period when the database was unavailable. For example, the database persistence 520 can get updates from the database layer associated with the application that the status of the database has changed from unavailable to available. Because the database was unavailable, the database may not include the latest data for the application instance, as that information was stored by the in-memory map. To obtain the most recent set of data, the illustrated data synchronization process is performed.

When the persistence core 510 is notified or otherwise determines that the database is available, the persistence core 510 requests to read data in pieces (e.g., one record at a time) from the database layer (at 540) and from the in-memory map (at 542), where the requests for reading data are sent through the database persistence 520 and the in-memory persistence 530. The persistence core 510 receives read data for a single piece of data from the database and searches for a corresponding piece of data in the in-memory map to determine whether the data corresponds to each other. The persistence core 510 may search for the corresponding piece of data, for example, by reading a key-value pair stored at the in-memory map that has a corresponding key that is the same as a key associated with the database piece of data. In this example, the key may be extracted first from the piece of data from database, and the searching may be performed according to the extracted key. If there is no data, e.g., key-value pair, in the in-memory map that can be found to correspond to the single piece of data from the database, then the piece of data is deleted from the database, such as by sending a delete instruction to the database persistence 520. If there is data in the in-memory map, e.g., existing key-value pair, that corresponds to the piece of data in the database and the data in the database and the in-memory map corresponds to each other (e.g., equivalent key-value content is confirmed), then a next piece of data is read from the database and from the in-memory map, and an iterative evaluation is performed. When there is data that does not correspond at both storages, then the stored piece of data can be deleted from the database (at 543). By performing these iterations, data that has been deleted from the in-memory map while the database was unavailable is deleted from the database.

After the data from the in-memory map and the database is compared and corresponding delete operations are performed at the database, the persistence core 510 requests (at 547) to read data from the in-memory map through the in-memory persistence 530, then reads corresponding data from the database through the database persistence 520 (at 545). An evaluation is then performed to determine whether the data in the in-memory map and the data in the database correspond. If the data read from the in-memory map corresponds to the data read from the database, then the persistence core 510 determines whether the timestamp of the data at the in-memory map is newer than the timestamp of the data at the database. If the in-memory data timestamp is more recent than the database timestamp, then the piece of data read from the in-memory map is stored (at 550) in the database through the database persistence 520. If the in-memory data timestamp is not more recent than the corresponding data in the database, a next iteration of comparisons is performed, and the process can continue until complete. If the data read from the in-memory map does not correspond to the data read from the database, the database persistence stores the piece of data read from the in-memory map. For example, the data read from the in-memory map may not correspond to the data read from the database if there is no matching data in the database to data existing in the in-memory map, i.e., the data exists only in the in-memory map.

In some instances, after data records that do not correspond between the storage locations are deleted from the database, and data that is in the in-memory map is replicated into the database, the database can be marked (at 560) through the database persistence 520 as a primary storage for the application and the data synchronization is completed. This marking of the database as a primary storage may be performed by updating the configuration of the primary storage at the persistence core module 510, where the configuration is used to determine how to proceed when requests for data operations are received for a particular application instance.

Figure 6:
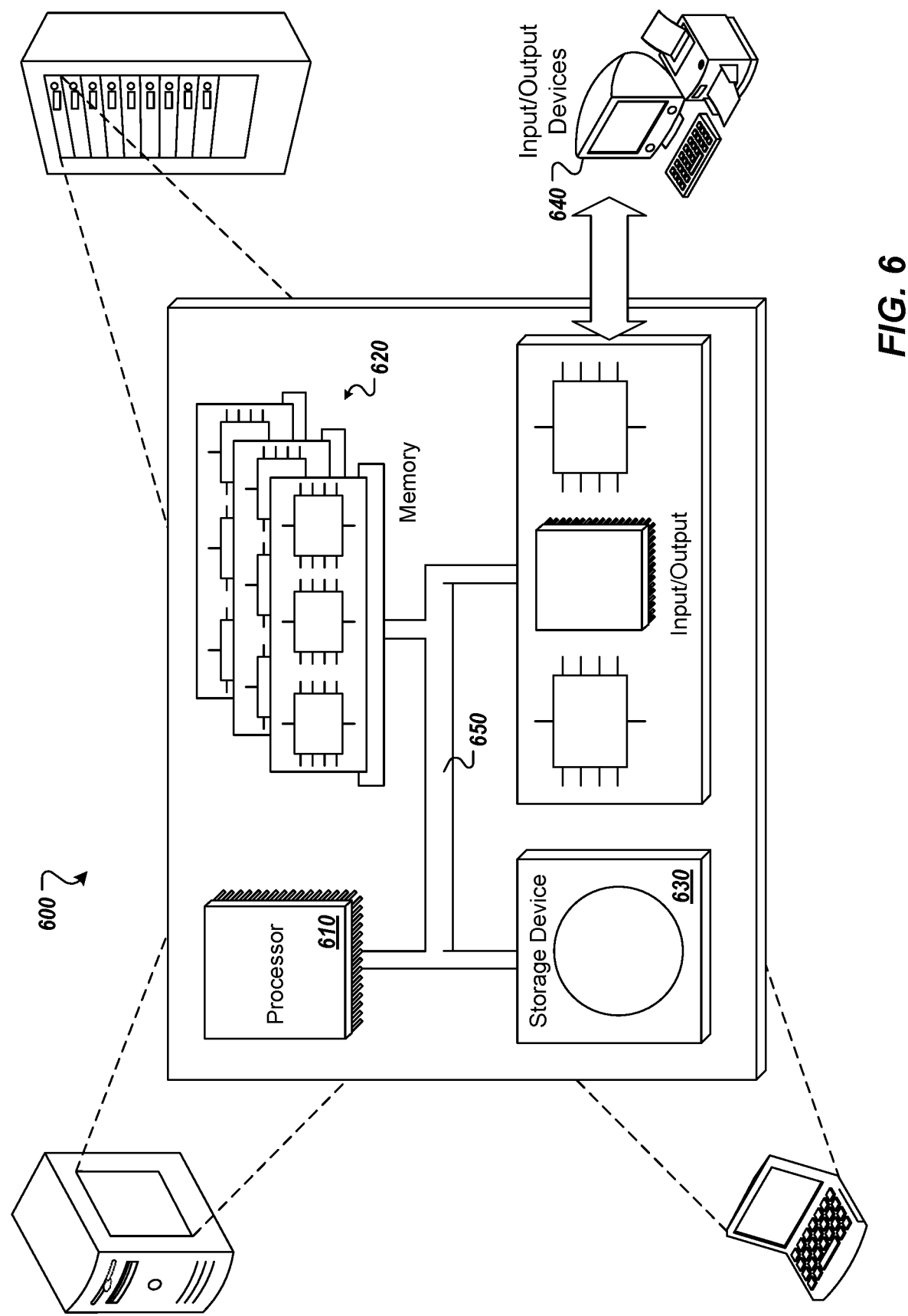
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device, such as a CRT (cathode ray tube) or LCD (liquid crystal display) monitor for displaying information to the user and a keyboard and a pointing device, such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, the method comprising:
    receiving a first request at a first instance of an application, the first request associated with a request to write data in a database layer associated with the application, wherein the application is associated with a plurality of instances, and wherein the plurality of instances share the database layer for reading and writing data associated with the application;
    in response to determining that the database layer has become unavailable for accessing after identifying the database layer as a primary storage for the application:
        configuring an in-memory persistence storage as a new primary storage for the first instance of the application;
        writing the data at the in-memory persistence storage at the first instance of the application; and
        routing a second request received at the first instance of the application to the in-memory persistence storage while the in-memory persistence storage is configured as the primary storage for the first instance of the application, wherein the second request is for reading or writing data at the database layer; and
    in response to determining that the database layer is available after configuring the in-memory persistence storage as the new primary storage for the first instance of the application:
        performing a synchronization of data between the in-memory persistence storage and the database layer, wherein the synchronization comprises:
            copying data stored at the in-memory persistence storage to the database layer, wherein the copied data is data that is not persisted at the database layer; and
            deleting data stored at the database layer that does not correspond to data persistent in the in-memory persistence storage; and
        configuring the database layer as an updated primary storage for the application.

2. The method of claim 1, further comprising:
    iteratively checking whether the database layer is available for accessing to maintain a current availability status of the database layer for the application.

3. The method of claim 1, further comprising:
    dynamically configuring a primary persistence storage for the first instance of the application, wherein dynamically configuring the primary persistence storage comprises:
        configuring the database layer as the primary persistence storage when a current availability status of the database layer is determined to available; and
        in response to determining that the current availability status of the database layer is unavailable, dynamically changing the primary persistence storage to the in-memory persistence storage.

4. The method of claim 1, further comprising:
    in response to
        configuring the database layer as the primary storage for the application
        writing the data in the database layer; and
        writing the data at the in-memory persistence storage associated with the first instance of the application.

5. The method of claim 4, wherein, while the synchronization is performed and until the synchronization is complete, the in-memory persistence storage continues to be configured as the primary storage.

6. The method of claim 1, wherein storing the data at the in-memory persistence storage comprises:
    converting the data to key-value pair data to store the key-value pair data to the in-memory persistence storage, wherein the in-memory persistence storage is a map storage associated with the first instance of the application; and
    storing the key-value pair data to the in-memory persistence storage associated with the first instance of the application.

7. The method of claim 6, further comprising:
    automatically replicating the data stored at the in-memory map storage associated with the first instance of the application to at least one other instance of the application from the plurality of instances of the application.

8. A non-transitory, computer-readable medium coupled to one or more processors and having instructions stored thereon which, when executed by the one or more processors, cause the one or more processors to perform operations, the operations comprising:
    receiving a first request at a first instance of an application, the first request associated with a request to write data in a database layer associated with the application, wherein the application is associated with a plurality of instances, and wherein the plurality of instances share the database layer for reading and writing data associated with the application;
    in response to determining that the database layer has become unavailable for accessing after identifying the database layer as a primary storage for the application:
        configuring an in-memory persistence storage as a new primary storage for the first instance of the application;
        writing the data at the in-memory persistence storage at the first instance of the application; and
        routing a second request received at the first instance of the application to the in-memory persistence storage while the in-memory persistence storage is configured as the primary storage for the first instance of the application, wherein the second request is for reading or writing data at the database layer; and in response to determining that the database layer is available after configuring the in-memory persistence storage as the new primary storage for the first instance of the application:

performing a synchronization of data between the in-memory persistence storage and the database layer, wherein the synchronization comprises:

copying data stored at the in-memory persistence storage to the database layer, wherein the copied data is data that is not persisted at the database layer; and deleting data stored at the database layer that does not correspond to data persistent in the in-memory persistence storage; and configuring the database layer as an updated primary storage for the application.

9. The computer-readable medium of claim 8, wherein the operations further comprise:

iteratively checking whether the database layer is available for accessing to maintain a current availability status of the database layer for the application;

dynamically configuring a primary persistence storage for the first instance of the application, wherein dynamically configuring the primary persistence storage comprises:

configuring the database layer as the primary persistence storage when a current availability status of the database layer is determined to available; and in response to determining that the current availability status of the database layer is unavailable, dynamically changing the primary persistence storage to the in-memory persistence storage.

10. The computer-readable medium of claim 8, wherein the operations further comprise:

in response to configuring the database layer as the primary storage for the application writing the data in the database layer; and writing the data at the in-memory persistence storage associated with the first instance of the application.

11. The computer-readable medium of claim 8, wherein storing the data at the in-memory persistence storage comprises:

converting the data to key-value pair data to store the key-value pair data to the in-memory persistence storage, wherein the in-memory persistence storage is a map storage associated with the first instance of the application; and storing the key-value pair data to the in-memory persistence storage associated with the first instance of the application.

12. The computer-readable medium of claim 11, wherein the operations further comprise:

automatically replicating the data stored at the in-memory map storage associated with the first instance of the application to at least one other instance of the application from the plurality of instances of the application.

13. A system comprising a computing device; and a computer-readable storage device coupled to the computing device and having instructions stored thereon which, when executed by the computing device, cause the computing device to perform operations, the operations comprising:

receiving a first request at a first instance of an application, the first request associated with a request to write data in a database layer associated with the application, wherein the application is associated with a plurality of instances, and wherein the plurality of instances share the database layer for reading and writing data associated with the application;

in response to determining that the database layer has become unavailable for accessing after identifying the database layer as a primary storage for the application:

configuring an in-memory persistence storage as a new primary storage for the first instance of the application;

writing the data at the in-memory persistence storage at the first instance of the application; and routing a second request received at the first instance of the application to the in-memory persistence storage while the in-memory persistence storage is configured as the primary storage for the first instance of the application, wherein the second request is for reading or writing data at the database layer; and in response to determining that the database layer is available after configuring the in-memory persistence storage as the new primary storage for the first instance of the application:

performing a synchronization of data between the in-memory persistence storage and the database layer, wherein the synchronization comprises:

copying data stored at the in-memory persistence storage to the database layer, wherein the copied data is data that is not persisted at the database layer; and deleting data stored at the database layer that does not correspond to data persistent in the in-memory persistence storage; and configuring the database layer as an updated primary storage for the application.

14. The system of claim 13, wherein the system further comprises instructions which when executed cause the computing device to perform operations comprising:

iteratively checking whether the database layer is available for accessing to maintain a current availability status of the database layer for the application;

dynamically configuring a primary persistence storage for the first instance of the application, wherein dynamically configuring the primary persistence storage comprises:

configuring the database layer as the primary persistence storage when a current availability status of the database layer is determined to available; and in response to determining that the current availability status of the database layer is unavailable, dynamically changing the primary persistence storage to the in-memory persistence storage.

15. The system of claim 13, wherein the system further comprises instructions which when executed cause the computing device to perform operations comprising:

in response to configuring the database layer as the primary storage for the application writing the data in the database layer; and writing the data at the in-memory persistence storage associated with the first instance of the application.

16. The system of claim 13, wherein storing the data at the in-memory persistence storage comprises:

converting the data to key-value pair data to store the key-value pair data to the in-memory persistence storage, wherein the in-memory persistence storage is a map storage associated with the first instance of the application; and storing the key-value pair data to the in-memory persistence storage associated with the first instance of the application.

17. The system of claim 16, wherein the system further comprises instructions which when executed cause the computing device to perform operations comprising:

automatically replicating the data stored at the in-memory map storage associated with the first instance of the application to at least one other instance of the application from the plurality of instances of the application.

* * * * *